United States Patent [19]

Tanibata

[11] Patent Number: 5,682,254
[45] Date of Patent: Oct. 28, 1997

[54] IMAGE COMBINING PRINTER

[75] Inventor: Tohru Tanibata, Wakayama, Japan

[73] Assignee: Noritsu Koki Co., Ltd., Wakayama-ken, Japan

[21] Appl. No.: 508,451

[22] Filed: Jul. 28, 1995

Related U.S. Application Data

[63] Continuation-in-part of Ser. No. 59,957, May 13, 1993, abandoned.

[30] Foreign Application Priority Data

May 21, 1992 [JP] Japan .................. 4-128894

[51] Int. Cl.⁶ .................. H04N 1/46; G03B 27/52
[52] U.S. Cl. .................. 358/501; 358/540; 358/450; 396/322; 399/194; 355/41; 355/20
[58] Field of Search .................. 358/501, 530, 358/540, 401, 450, 498; 396/310, 314, 315, 322; 355/20, 32, 35, 39, 40, 41, 46, 48, 50; 399/194; H04N 1/46; G03B 27/52

[56] References Cited

U.S. PATENT DOCUMENTS

| | | | |
|---|---|---|---|
| 4,896,186 | 1/1990 | Tokuda | 355/40 |
| 4,959,683 | 9/1990 | Otake et al. | 355/40 |
| 4,963,919 | 10/1990 | Matsumoto et al. | 355/40 |
| 4,984,008 | 1/1991 | Frystak et al. | 355/40 |
| 4,998,131 | 3/1991 | Ueda et al. | 355/40 |
| 5,031,122 | 7/1991 | Witty | 355/34 |
| 5,068,742 | 11/1991 | Ohikoshi et al. | 355/40 |
| 5,072,253 | 12/1991 | Patton | 355/40 |
| 5,077,573 | 12/1991 | Murayama et al. | 355/40 |
| 5,086,310 | 2/1992 | Iwashita et al. | 355/40 |
| 5,231,451 | 7/1993 | Uekusa et al. | 355/40 |
| 5,274,418 | 12/1993 | Kazami et al. | 355/40 |
| 5,337,119 | 8/1994 | Tanibata | 355/40 |

FOREIGN PATENT DOCUMENTS 2-136840  5/1990  Japan .
2-184835  7/1990  Japan .

*Primary Examiner*—Thomas L. Stoll
*Attorney, Agent, or Firm*—Wenderoth, Lind & Ponack

[57] ABSTRACT

An image combining printer, capable of producing a highly intelligible image combination print having explicit colors and shapes, includes: a scanner for reading colors of an original image from a negative film; a color identifier for estimating positive colors on a finished print from the color data of the scanner; a color area determining element for determining the size of a color area to be exposed a multiple number of times in accordance with a scale of enlargement; a vertical position detector for detecting a vertical position data which represents the upward and downward positioning of the original image in the negative film; a vertical position determining element for determining the vertical position of the original image from the vertical position data of the vertical position detector; an exposure element for exposing a photosensitive material to the original image projected from the negative film; a multiple exposure condition determining element for determining the location, orientation, and color of an additional image or pattern, e.g. characters symbols, or markings, for double exposure by reviewing the resultant data of the color identifier, the color area determining element, and the vertical position determining element, and a multiple exposure element for exposing the photosensitive material to the additional image corresponding to the exposure condition data of the multiple exposure condition determining element so that the additional image can be printed at an optimum intelligible location and orientation in a desired color.

6 Claims, 5 Drawing Sheets

IMAGE COMBINING PRINTER

CROSS-REFERENCE TO RELATED APPLICATION

This is a Continuation-In-Part of application Ser. No. 08/059,957, filed May 13, 1993 now abandoned.

BACKGROUND OF THE INVENTION

The present invention relates to an image combining printer which prints in combination different types of images.

Some conventional image combining printers have been provided for producing e.g. picture post-cards or combination prints which contain photographic pictures and their relevant characters, symbols, and/or markings. Such a conventional image combining printer is, however, capable of adding only a single color pattern image of characters, for example. Accordingly, when the color of an additional image is similar to the color of the original image, a finished print will become less intelligible.

Also, the additional image has to be printed outside the original image. More particularly, the additional image may need to be reduced in size for printing in an extra space or the overall size of a combination print may need to be increased to provide a space for printing the additional image.

If the size of the additional image is not reduced or the overall size of the print is not increased, the use of a mask is required for an exposure operation. As a part of the original image may be concealed by the masking, it cannot appear in the finished print.

SUMMARY OF THE INVENTION

For overcoming the forgoing drawbacks, it is an object of the present invention to provide an image combining printer capable of producing a highly intelligible image combination print which has explicit colors and shapes.

An image combining printer according to the present invention comprises: a scanner for reading colors of an original image from a negative film; a color identifying means for estimating positive colors on a finished print from the color data of the scanner; a color area determining means for determining the size of a color area to be exposed a multiple number of times in accordance with a scale of enlargement; a vertical position detecting means for detecting vertical position data which represents the upward and downward positioning of the original image in the negative film; a vertical position determining means for determining the vertical position of the original image from the vertical position data of the vertical position detecting means; an exposure means for exposing a photosensitive material to the original image projected from the negative film; a multiple exposure condition determining means for determining the location, orientation, and color of an additional image or pattern, e.g. characters, symbols, or markings, for double exposure by reviewing the resultant data of the color identifying means, the color area determining means, and the vertical position determining means; and a multiple exposure means for exposing the photosensitive material to the additional image corresponding to the exposure condition data of the multiple exposure condition determining means so that the additional image can be printed at an optimum intelligible location and orientation in a desired color.

Also, another image combining printer, similar to the foregoing printer, is characterized in that the multiple exposure means comprises a PLZT (lead lanthanum zirconate titanate) head of a linear form extending at a right angle to a pass line of a photosensitive material, a light modulation filter unit, and a light modulation filter driving mechanism for performing a line exposure on the photosensitive material during running.

A further image combining printer, similar to the foregoing printer, is characterized in that the multiple exposure means is an exposing means employing a CRT.

A still further image combining printer, similar to the foregoing printer, is characterized by an image attribute information detecting means for detecting an attribute data, e.g. shooting date, from the negative film, a multiple exposure condition determining means for determining a multiple exposure condition for printing an image of the attribute data supplied from the image attribute information detecting means, and an exposure controlling means for controlling the exposure of the image on the basis of the multiple exposure condition of the multiple exposure condition determining means.

Also, another image combining printer, similar to the foregoing printer, is characterized in that the multiple exposure means comprises a PLZT head of linear form extending at a right angle to the pass lines of a photosensitive material, a light modulation filter unit, and a light modulation filter driving mechanism for performing a line exposure on the photosensitive material during running.

A further image combining printer, similar to the foregoing printer, is characterized in that the multiple exposure means is an exposing means employing a CRT.

The image combining printer of the present invention comprises: a scanner for reading colors of an original image from a negative film; a color identifying means for estimating positive colors on a finished print from the color data of the scanner; a color area determining means for determining the size of a color area to be exposed a multiple number of times in accordance with a scale of enlargement; a vertical position detecting means for detecting a vertical position data which represents the upward and downward positioning of the original image in the negative film; a vertical position determining means for determining the vertical position of the original image from the vertical position data of the vertical position detecting means; a multiple exposure condition determining means for determining the location, orientation, and color of an additional image or pattern, e.g. characters, symbols, or markings, for double exposure by reviewing the resultant data of the color identifying means, the color area determining means, and the vertical position determining means; and a multiple exposure means for exposing the photosensitive material to the additional image with color variations according to the exposure color data of the multiple exposure condition determining means. As the result, even if the area of the original image to be exposed contains various colors, an optimum exposure action can be carried out to produce an image combination print which is highly intelligible.

Also, there is provided a combination of the color area determining means for determining the size of a color area to be exposed a multiple number of times in accordance with a scale of enlargement, the multiple exposure condition determining means for determining the location and orientation of an additional image or pattern for double exposure by reviewing the resultant data of the color area determining means, and the multiple exposure means for exposing the photosensitive material to the additional image at an optimum state defined by the exposure condition data of the multiple exposure condition determining means, so that a finished image combination print can highly by intelligible.

DETAILED DESCRIPTION OF THE PREFERRED EMBODIMENT

A preferred embodiment of the present invention will be described in the form of an image combining printer referring to the accompanying drawings.

Figure 1:
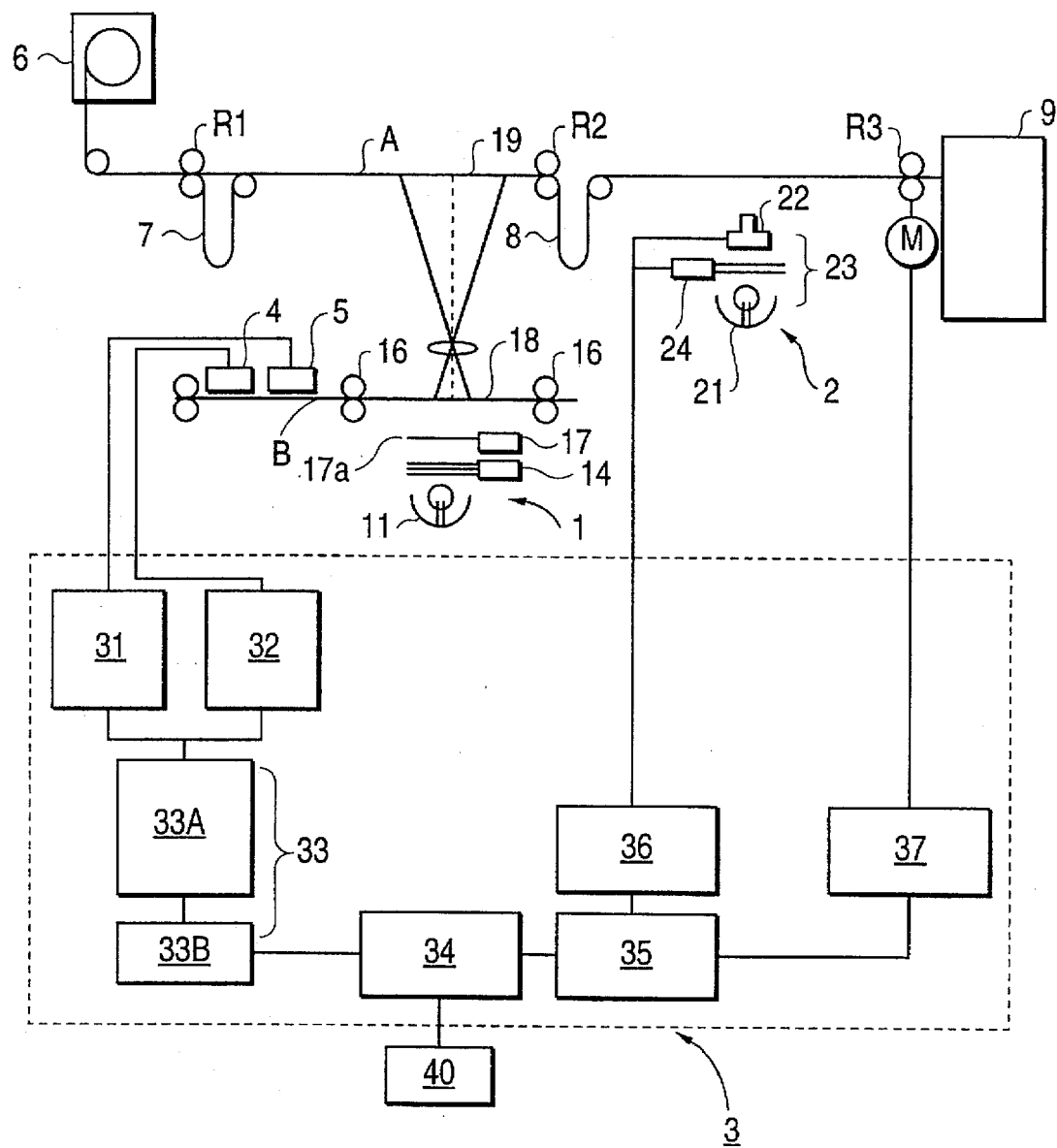
FIG. 1 is a schematic view of an image combining printer according to the present invention.

FIG. 1 shows a schematic view of the image combining printer in which an exposure means 1 and a double exposure means 2 are arranged across a pass line along which a photosensitive material A of a tape shape is transferred.

The exposure means 1 comprises a light source 11, a lens 12, a light modulation filter unit 13 arranged across the light path between the light source 11 and the negative film B for advancing into and retracting from the light path, a light modulation filter driving means 14 for controlling the movement of the light modulation filter unit 13, a mechanical shutter 17A arranged for mechanically closing the light path between the light source 11 and the light modulation filter unit 14 in response to a command signal from a controller 3, described later, in order to pass a desired tone of light, and a mechanical shutter driving mechanism 17. The photosensitive material A which is stopped at an exposure station 19 is exposed to a photographic or original image A1 which is projected from the negative film B by illumination of the light source 11.

The negative film B is driven by a transfer roller unit 16 to a projection station 18 of the exposure means 1 for optical projection.

A multiple exposure means 2 comprises a light source 21, a PLZT head 22 of linear form extending at a right angle to the pass line of a photosensitive material A, a light modulation filter unit 23, and a light modulation filter driving mechanism 24 for actuating the light modulation filter unit 23 to move to and from the light path between the light source 21 and the PLZT head 22. The PLZT head 22 is arranged to receive a light transmitted from the light source 21 through the light modulation filter unit 23. The photosensitive material A on which an original image A1 of e.g. photo, character, or symbols, is printed in various colors is exposed again to an additional image A2 for printing at a desired position in a desired color and shape through the action of the light modulation filter driving mechanism 24 which is controlled by a command signal from a multiple exposure condition determining means 33, described later.

The PLZT head 22 comprises layers of an analyzer, a PLZT crystal, and a polarizer, in which the analyzer is covered with a selfoc lens-eye.

The double exposure means 2 may be an exposure device using a CRT.

A scanner 5 reads colors all over the original image in the negative film B and the read out data is utilized in light conditioning at the exposure means 1 as already known in the prior art.

Figure 2:
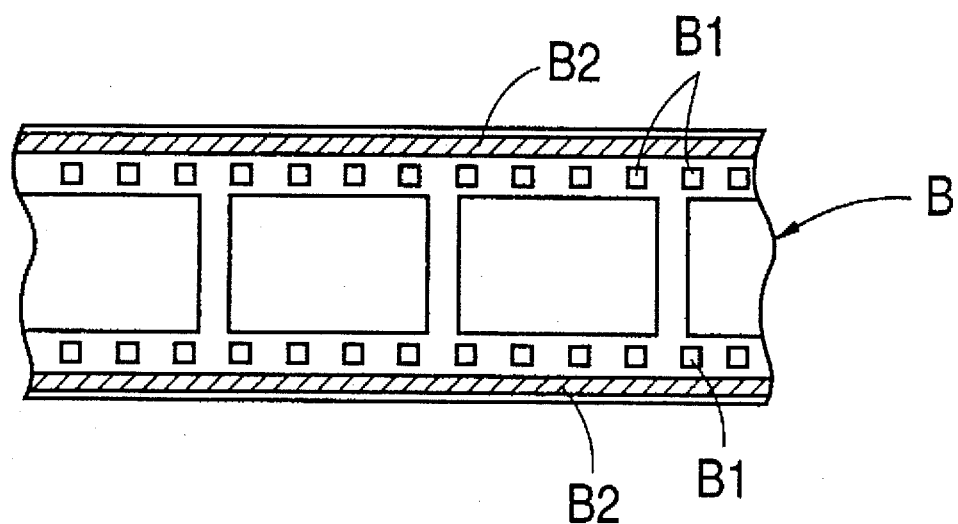
FIG. 2 is a plan view of a negative film.
Figure 3:
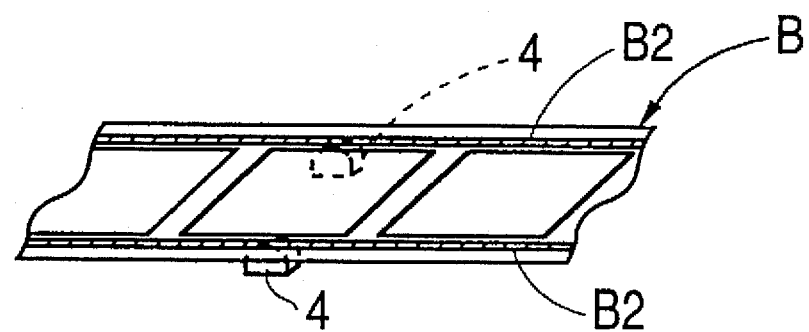
FIG. 3 is a perspective view of a read head for scanning the negative film.

An attribute data detecting unit 4, as shown in FIGS. 2 and 3, reads upper/lower positioned data B2 of the original image including attribute data such as a shooting date and a message to be exposed, and sends the read out data as electric signals to the controller 3.

As shown in FIG. 1, a controller 3 comprises a negative film original image color identifying unit (a color identifying means) 31, a negative film attribute data identifying unit (upper/lower position data identifying means) 32, a multiple exposure condition determining means 33, a computer central unit 34, a PLZT exposure control unit 35, a PLZT exposure timing and PLZT exposure color controller unit 36, and a paper transfer timing control unit 37.

The negative film attribute data identifying unit 32 identifies an upper/lower position of an original image in an image frame of the negative film using data, such as upper/lower position data, read by the attribute data detecting unit 4.

The multiple exposure condition determining means 33 is composed of a PLZT exposure position identifying unit (a color area determining means) 33A and a PLZT exposure color identifying unit 33B. The multiple exposure condition determining means 33 determines the position, orientation, and color of the additional image or pattern, e.g., characters, symbols, or markings, for double exposure by reviewing the results of the negative film original image color identifying unit 31 and the negative film attribute data identifying unit 32.

The PLZT exposure position identifying unit 33A recognizes the upper/lower position of the original image from the upper/lower position data and also recognizes a size of an area to be subject to double exposure from the attribute data. According to the color data the original image in the negative film read by the scanner 5, the PLZT exposure position identifying unit 33A identifies which position in the negative film is most appropriate for additionally exposing the attribute data of the recognized size. Generally, a position appropriate for additional exposure is a position having a highest density in the negative film.

The PLZT exposure color identifying unit 33B identifies proposed color after printing from the colors of the negative film at the exposure position identified by the PLZT exposure position identifying unit 33A to determine an exposure color. The exposure color is preferred to be close to a complementary color of the negative film after printing.

When the original image contains a multiplicity of colors at the exposure location of the additional image, the color of the additional image will be varied according to the variety of colors of the original image.

There is provided a magazine 6 in which the photosensitive material A is installed in a roll, two loop stations 7 and 8, and a chemical processing unit 9 in which the photosensitive material A exposed is separated by a cutter into frames which are then recovered as prints in a tray 91. Elements R1, R2, and R3 are transfer roller units.

An advance motor M is mounted for driving the transfer roller unit R3.

A first loop station 7 is arranged on the pass line before an exposure means 1 where the photosensitive material A runs in a loop before being exposed for projection printing.

Similarly, a second loop station 8 is arranged on the pass line between the exposure means 1 and the multiple exposure means 2, where the photosensitive material A carrying the original image A1 and released from the exposure means 1 runs in a loop.

There are some methods of recording the vertical position data onto the negative film B including, for example, printing of markings onto a negative by means of a mercury switch as disclosed in Japanese Laid-open Patent Publication No. 2-184835 (1990) and bonding of a magnetic tape, which carries relevant data for vertical position, date, and time of shooting, to a negative as depicted in Japanese Laid-open Patent Publication No. 2-136840 (1990). In this embodiment, as shown in FIG. 2, the negative film B has two magnetic coating tracks B2 provided on the outer sides of both perforations B1 respectively. Using a specific camera with a data entry keyboard mounted on the back thereof, a desired message can be recorded onto the magnetic coating tracks B2 by manipulating the keyboard while the shooting data of vertical position, data, and time are automatically recorded to the same.

The production of image combination prints with the image combining printer of the present invention will now be explained in a sequence.

1. Various data including the vertical position, data, and relevant messages are read out from the negative film B with the vertical position data and attribute data detecting means 4 and sent as electric signals to the controller 3.
2. Then, colors in the original image are scanned from the negative film B with the scanner 5 and fed as electric signals to the controller 3 together with enlargement data at exposure.
3. The negative film B is transferred to a projecting station 18 of the exposure means 1.

Simultaneously, the photosensitive material A is unloaded from the magazine 6 by the action of the transfer roller unit R1 and transferred to the first loop station 7 where it runs in a loop before advancing to an exposure station 19 of the exposure means 1.

4. Both a light modulation filter unit 13 and a mechanical filter 17A of the exposure means 1 are then actuated by command signals from the controller 3 which correspond to the color data of the scanner 5. Succeedingly, the photosensitive material A is exposed at the exposure station 19 to the original image A1 projected from its negative B.
5. Meanwhile, the controller 3 determines the exposing location, orientation, and color of the additional image A2 on referring to data from the vertical position data and attribute data detecting means 4 and the scanner 5 and delivers them as command signals to the multiple exposure unit 2 and to the transfer motor M. While the command signals control the actions of the light modulation filter driving mechanism 24 and the PLZT head 22 in the multiple exposure unit 2, the photosensitive material A driven by the motor M is line exposed to the additional image A2.

The exposure means 1 and the multiple exposure unit 2 are separated by the second loop station 8 and can thus perform exposure operations independently of each other.

Figure 4:
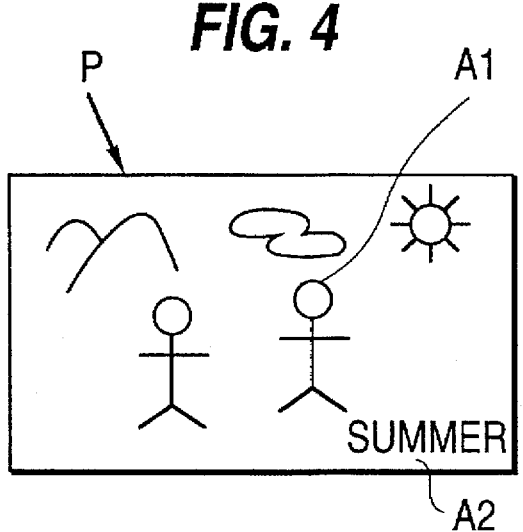
FIG. 4 illustrates an image combination print produced by the image combining printer of the present invention.
Figure 5:
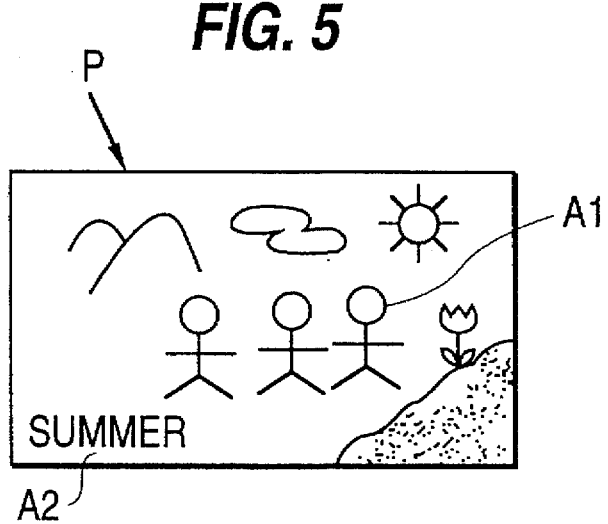
FIG. 5 illustrates another image combination print produced by the image combining printer of the present invention.

FIGS. 4 and 5 illustrate a finished print P of the two combined images produced by the image combining printer of the present invention. As shown, the exposure location of the additional image A2 may be predetermined for producing a best intelligible layout of the print, for example, by selecting a priority location from among lower right, lower left, upper right, and upper left positions within the image frame.

Figure 6:
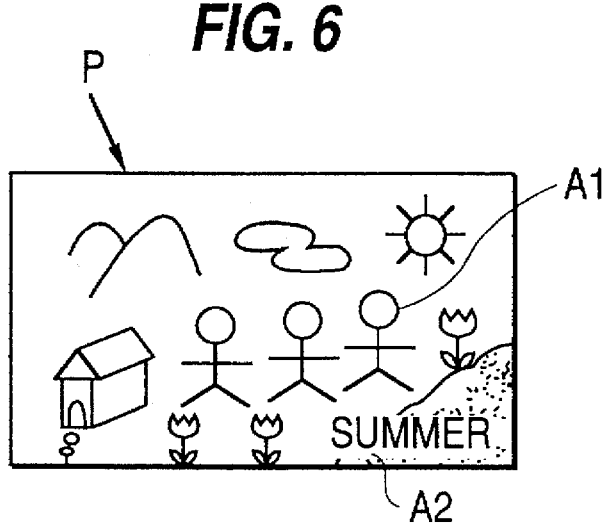
FIG. 6 illustrates a further image combination print produced by the image combining printer of the present invention.

When the original image A1 contains a multiplicity of colors at the exposure location of the additional image A2, the color of the additional image A2 will be varied partially to create an optimum distinctive effect (See FIG. 6).

Figure 7:
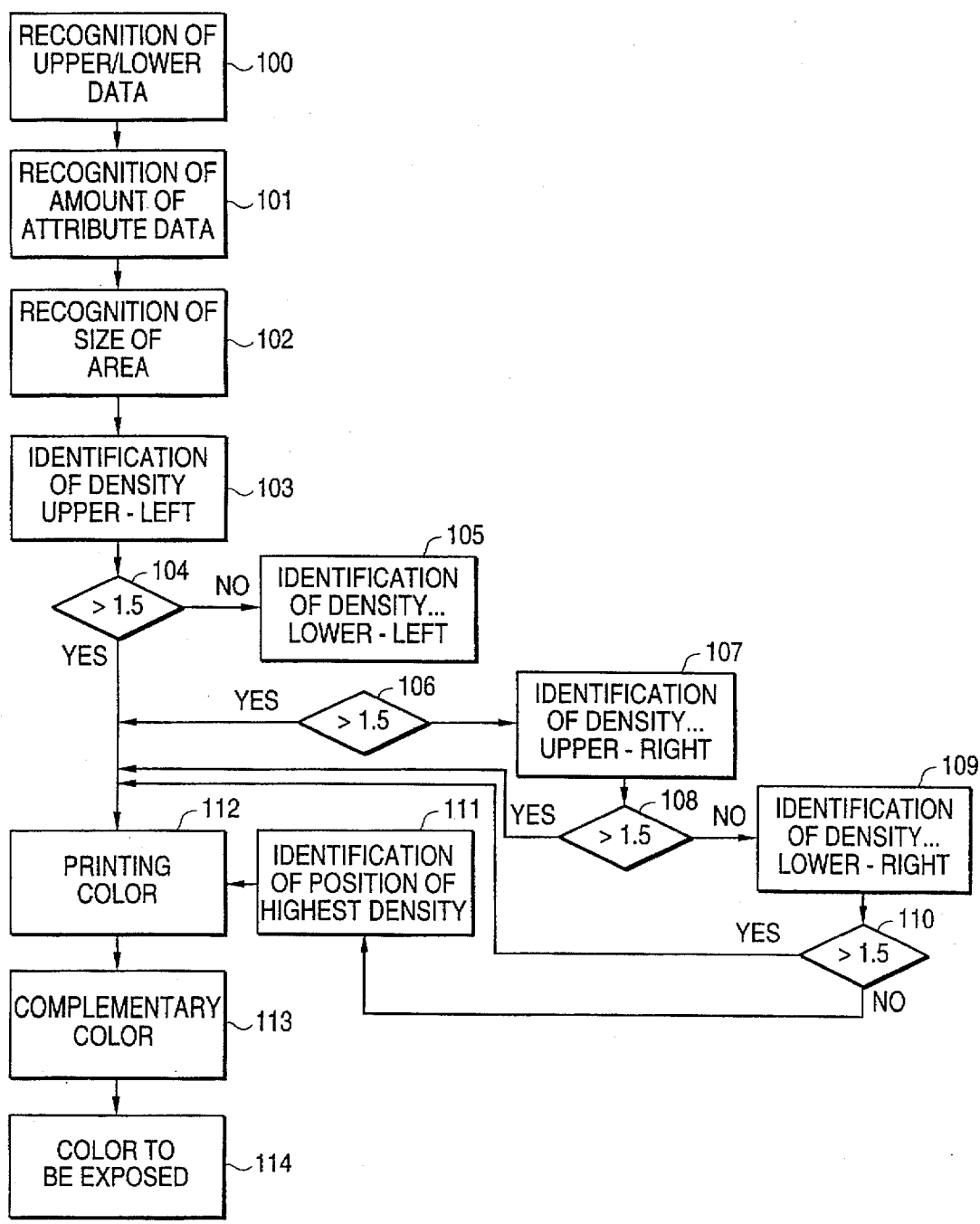
FIGS. 7 and 8 are flowcharts showing alternative methods of selecting an exposure location of a negative film.

FIG. 7 is a flow chart showing steps for determining an exposure location (position) of an additional image according to a predetermined priority scheme. The negative film is exposed to the additional image at the highest priority position where the density of the negative film is higher than a predetermined value.

The priority scheme is predetermined, for example, to start from upper left, and is succeeded with lower left, upper right and lower right. Threshold value of density is determined to be 1.5, for example.

First, an upper/lower position is recognized by an upper/lower data from a negative film and a size of area to be exposed is recognized by an attribute data in Steps 100 to 102.

Second, a double exposure location where the density of the negative film is higher than the predetermined value is identified according to the priority in Steps 103 to 110.

In case the density of any position is not higher than the predetermined value, the position which has highest density among the four positions is identified (Step 111).

Next, a printing color is identified by the color at the double exposure position in Step 112, a complementary color is recognized in Step 113 and then, a color to be exposed is finally determined in Step 114.

Figure 8:
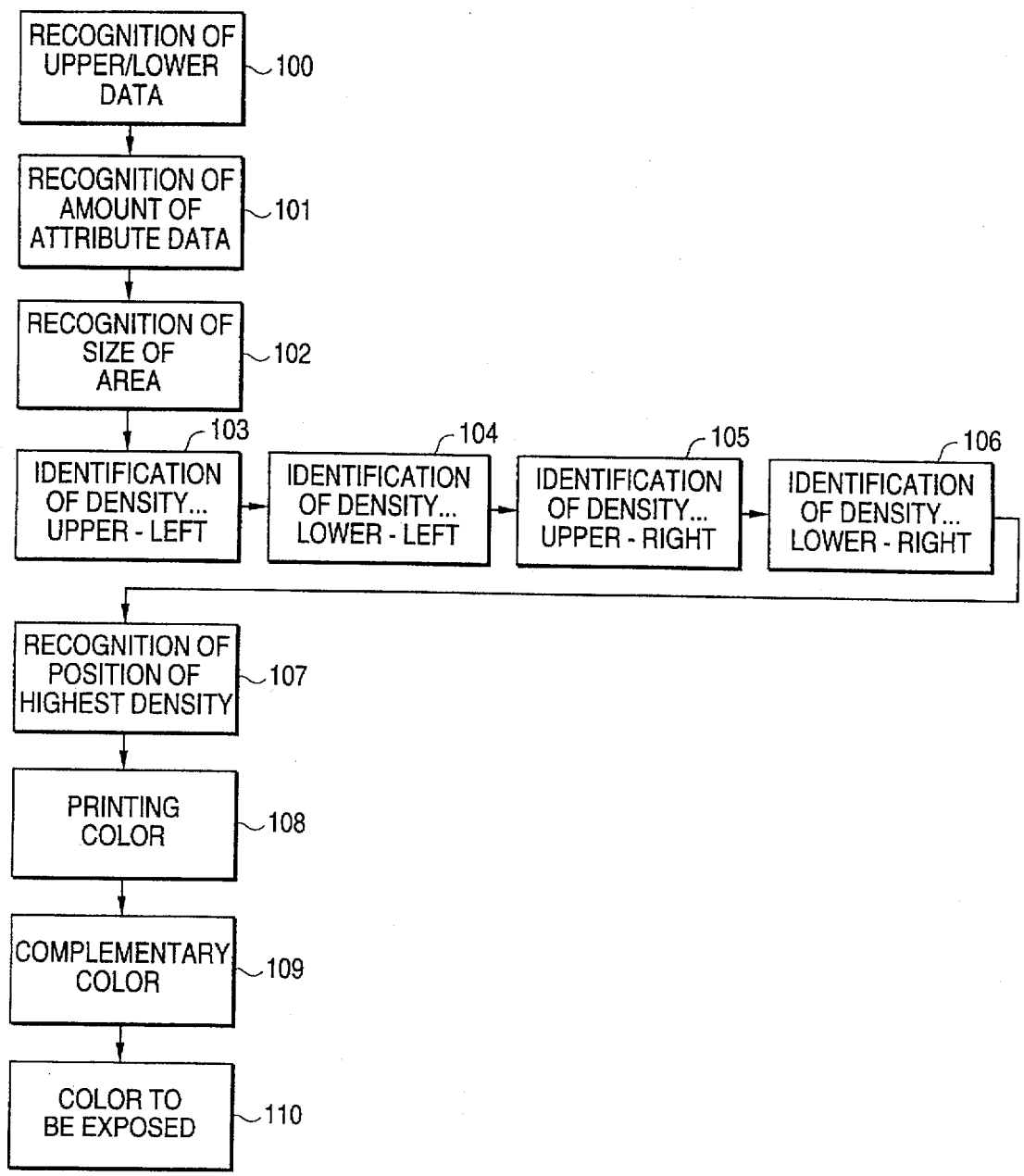

FIG. 8 is another flow chart showing steps for determining an exposure location (position) of an additional image. The negative film is exposed to the additional image where density of the negative film is highest.

First, an upper/lower position is recognized by an upper/lower data from a negative film and a size of area to be exposed is recognized by an attribute data in Steps 100 to 102.

Second, a double exposure location where the density of the negative film is highest is recognized in Steps 103 to 107.

Next, a printing color is identified from the color at the double exposure position in Step 108, a complementary color is recognized in Step 109 and then, a color to be exposed is finally determined in Step 110.

If a further data is entered by an entry device 3A, it will be examined in combination with the enlargement data, the vertical position data, and the color data from the scanner 5 and printed through multiple exposure in the same manner.

Although this embodiment employs the negative film B as a recording medium for printing information on the photosensitive material, other mediums such as positive film or transparencies can be used with equal success.

What is claimed:

1. An image combining printer comprising:
    a scanner for reading colors of an original image from a negative film;
    a color identifying means for estimating positive colors on a finished print from the color data of the scanner;
    a color area determining means for determining the size of a color area to be exposed a multiple number of times;
    a vertical position detecting means for detecting a vertical position data which represents the upward and downward positioning of the original image in the negative film;
    a vertical position determining means for determining the vertical position of the original image from the vertical position data of the vertical position detecting means;

an exposure means for exposing a photosensitive material to the original image projected from the negative film;

a multiple exposure condition determining means for determining the location, orientation, and color of an additional image or pattern, which may include characters symbols, or markings, for double exposure by reviewing the resultant data of the color identifying means, the color area determining means, and the vertical position determining means; and a multiple exposure means for exposing the photosensitive material to the additional image corresponding to the exposure conditions determined by the multiple exposure condition determining means so that the additional image can be printed at an optimum intelligible location and orientation in a desired color.

2. An image combining printer as recited in claim 1, wherein the multiple exposure means comprises a PLZT head of linear form extending at a right angle to a pass line of a photosensitive material, a light modulation filter unit, and a light modulation filter driving mechanism for performing a line exposure on the photosensitive material during running.

3. An image combining printer as recited in claim 1, wherein the multiple exposure means is an exposing means employing a CRT.

4. An image combining printer as recited in claim 1, further comprises:

an image attribute information detecting means for detecting an attribute data, which may include a shooting date, from the negative film;

a multiple exposure condition determining means for determining a multiple exposure condition for printing an image of the attribute data supplied from the image attribute information detecting means; and an exposure controlling means for controlling the exposure of the image on the basis of the multiple exposure condition of the multiple exposure condition determining means.

5. An image combining printer as recited in claim 4, wherein the multiple exposure means comprises a PLZT head of linear form extending at a right angle to a pass line of a photosensitive material, a light modulation filter unit, and a light modulation filter driving mechanism for performing a line exposure on the photosensitive material during running.

6. An image combining printer as recited in claim 5, wherein the multiple exposure means is an exposing means employing a CRT.

* * * * *